United States Patent [19]
Gallant

[11] Patent Number: 6,122,501
[45] Date of Patent: *Sep. 19, 2000

[54] SYSTEM AND METHOD FOR FLEXIBLE TRANSLATION OF WIRELESS SPECIAL DIALING STRINGS AND MOBILE FEATURE CODES

[75] Inventor: John K. Gallant, Plano, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/672,810

[22] Filed: Jun. 28, 1996

[51] Int. Cl.$^7$ ...................................................... H04Q 7/38

[52] U.S. Cl. ............................ 455/414; 455/433; 455/564

[58] Field of Search ....................................... 455/403, 414, 455/415, 416, 417, 432, 433, 445, 461, 550, 560, 564

[56] References Cited

U.S. PATENT DOCUMENTS

| | | | |
|---|---|---|---|
| 5,216,703 | 6/1993 | Roy | 455/560 X |
| 5,272,748 | 12/1993 | Davis | 455/564 |
| 5,353,331 | 10/1994 | Emery et al. | 455/461 |
| 5,428,665 | 6/1995 | Lantto | 455/414 |
| 5,440,614 | 8/1995 | Sonberg et al. | 455/432 |
| 5,504,804 | 4/1996 | Widmark et al. | 455/461 X |
| 5,557,655 | 9/1996 | Lantto | 455/433 |
| 5,758,286 | 5/1998 | Leppanen | 455/445 |

OTHER PUBLICATIONS

"Cellular Radiotelecommunications Intersystem Operations: Functional Overview," TIA/EI PN–2991.1, Telcommunications Industry Association: Arlington, VA (Nov. 1995).

"Cellular Features Desription," TIA/EIA/SP–3545, Telcommunications Industry Association: Arlington, VA (Jul. 1995).

*Primary Examiner*—William G. Trost
*Attorney, Agent, or Firm*—Satheesh Karra

[57] ABSTRACT

A system and method for translating special dialing strings and/or mobile feature codes in a wireless telecommunications network. Upon receipt of a special dialing string ("SDS") or mobile feature code ("MFC"), a mobile switching center passes the SDS or MFC to a centralized processing center. The centralized processing center includes a home location register (HLR) containing an SDS lookup table and/or an MFC lookup table. The SDS lookup table includes information pertaining to the dialed string, a subscriber group number, the mobile switching center group number, and a number to be dialed (translated number). The MFC lookup tables include information pertaining to the dialed string, the subscriber group number, and feature action to be invoked. Using the SDS lookup table in the HLR, an SDS can be translated into a number to be dialed. Using the MFC lookup table, an MFC can be processed to change the mobile subscriber's profile. By using a centralized translation table, SDSs/MFCs originating in a variety of geographic locations can be translated consistently. Additionally, SDS translation can be customized for any particular subscriber, geographic area, or a combination of both. After SDS translation, the number to be dialed may be returned to the mobile switching center. After MFC translation, the appropriate change to the subscriber's profile is made.

11 Claims, 5 Drawing Sheets

400

| SDS Lookup Table | | | |
|---|---|---|---|
| Dialed String ("DS") | Subscriber Group Number ("SGN") | Mobile Switching Center Group Number ("MGN") | Number to be dialed (translated number) |
| 420 | 430 | 440 | 450 |

410 — SDS Lookup Table

| MFC Lookup Table | | |
|---|---|---|
| Dialed String ("DS") | Subscriber Group Number ("SGN") | Action |
| 520 | 530 | 540 |

510 — MFC Lookup Table

FIG. 5

SYSTEM AND METHOD FOR FLEXIBLE TRANSLATION OF WIRELESS SPECIAL DIALING STRINGS AND MOBILE FEATURE CODES

BACKGROUND OF THE INVENTION

1. Field of the Invention

This invention relates generally to wireless telecommunications networks, and more specifically to a system and method for centralizing translation of a Special Dialing String ("SDS") and a Mobile Feature Code ("MFC") in a Home Location Register to permit consistent and/or customized translation of the SDS or MFC depending upon various subscriber and/or geographic factors.

2. Background

A typical wireless telecommunications network includes a large number of mobile switching centers, spread across a broad geographic area. Whenever a mobile subscriber places a call, a nearby mobile switching center receives the wireless signal for processing. As a mobile subscriber moves between different geographic locations, different mobile switching centers may receive the wireless signal and process the subscriber's call.

As a matter of convenience to mobile subscribers, many wireless telecommunications companies permit mobile subscribers to dial a telephone number using a special dialing string ("SDS"). An SDS is a shortened or abbreviated dialing string, often beginning with a symbol such as "*" or "#" and typically containing 3 digits (e.g., *123). When a mobile subscriber dials an SDS, a mobile switching center receives the SDS and then translates the received SDS into a number to be dialed (e.g., *123 may be translated to 555-1234). Similarly, many wireless telecommunications companies also support the use of mobile feature codes ("MFCs"). An MFC is similar to an SDS, but is used to control service features (e.g., call forwarding) from a mobile subscriber's handset.

In a typical wireless telecommunications system, translation of SDSs and MFCs occurs within the mobile switching center processing the mobile subscriber's call. Thus, for example, when a mobile subscriber in one geographic location dials *123, a mobile switching center in that same location performs the required SDS or MFC translation. In contrast, when the same mobile subscriber is in a different geographic location and dials the same SDS or MFC (e.g., *123), a different mobile switching center will likely process the call.

Because each mobile switching center independently translates SDSs into dialed numbers, it is possible that the same SDS will be translated into a different number to be dialed depending upon which mobile switching center performs the translation. For example, if a subscriber in one geographic location, such as Texas, dials *123, the Dallas mobile switching center may translate the call to dialed number 458-1440. Whereas, if a mobile subscriber in another geographic location, such as Washington, D.C., the Washington D.C. mobile switching center may translate the call to a different dial number such as 555-1212. For the same reason, it is also possible that different mobile switching centers will activate/de-activate different service features in response to the same MFC processed by the different mobile switching centers.

In order to alleviate inconsistent translation of SDSs/MFCs, each mobile switching center has to be independently programmed to translate received SDSs/MFCs. This requires considerable effort and expense. Furthermore, whenever the translation of an SDS into a number to be dialed is to be changed, the same change must be made in every mobile switching center.

Therefore, what is needed is a system and method to ensure consistent translation of SDSs/MFCs, without requiring independent programming or reprogramming of mobile switching centers. Furthermore, what is needed is the ability to customize dialing string translations. Customer(s) and/or geographic specific translations are needed for SDS translation and customer(s) specific translations are needed for MFC translation such that customized dialing strings can be used that may over-ride preexisting global translations.

SUMMARY OF THE INVENTION

The present invention solves the problem of inconsistent special dialing string ("SDS") translation and/or mobile feature code ("MFC") operation by providing a system and method that consistently translates SDSs/MFCs, regardless of the geographic location of the mobile subscriber. To accomplish this, the present invention employs a centralized translation table which is used to translate SDSs/MFCs that are received by any mobile switching center. The centralized translation table is contained in a Home Location Register ("HLR"). In the case of SDSs, the centralized translation table is known as an SDS lookup table. In the case of MFCs, the centralized translation table is known as an MFC lookup table.

All mobile switching centers communicate with the HLR for translation of received SDSs/MFCs. Thus, whenever an SDS/MFC is received by any mobile switching center, consistent translation is ensured. In addition, whenever a change in SDS/MFC translation is required, only the centralized HLR lookup table need be changed. This single change is far easier to make than to reprogram each mobile switching center. The single change is also less prone to error, as compared to making a large number of changes in various mobile switching centers.

Because the centralized HLR also contains mobile subscriber profile information as well as mobility management information, customized translation of SDSs is possible as well. For example, for any given mobile subscriber and/or mobile switching center, the same SDS may be translated into any number of different numbers to be dialed. Even in this case, however, the varying translations are still performed within the centralized HLR.

Additional features of the present invention will become apparent from the following detailed description of the invention, the figures referenced therein and the appended claims.

BRIEF DESCRIPTION OF THE FIGURES

The present invention is described with reference to the accompanying FIGS. In the figures, like reference numbers indicate identical or functionally similar elements. Additionally, the left-most digit(s) of a reference number identifies the figure in which the reference number first appears.

FIG. 4 illustrates the SDS lookup table record format;

FIG. 5 illustrates the MFC lookup table record format;

DETAILED DESCRIPTION OF THE PREFERRED EMBODIMENTS

The present invention provides a system and method for consistently translating a Special Dialing String ("SDS") or a Mobile Feature Code ("MFC") in a wireless telecommunications system. In addition, the present invention provides for custom or "flexible" translation of an SDS based on mobile subscriber and/or geographic information. Various embodiments of the present invention, preferably implementing each of these capabilities, are disclosed in detail below. A brief discussion of an exemplary wireless telecommunications system is presented as well.

Figure 1:
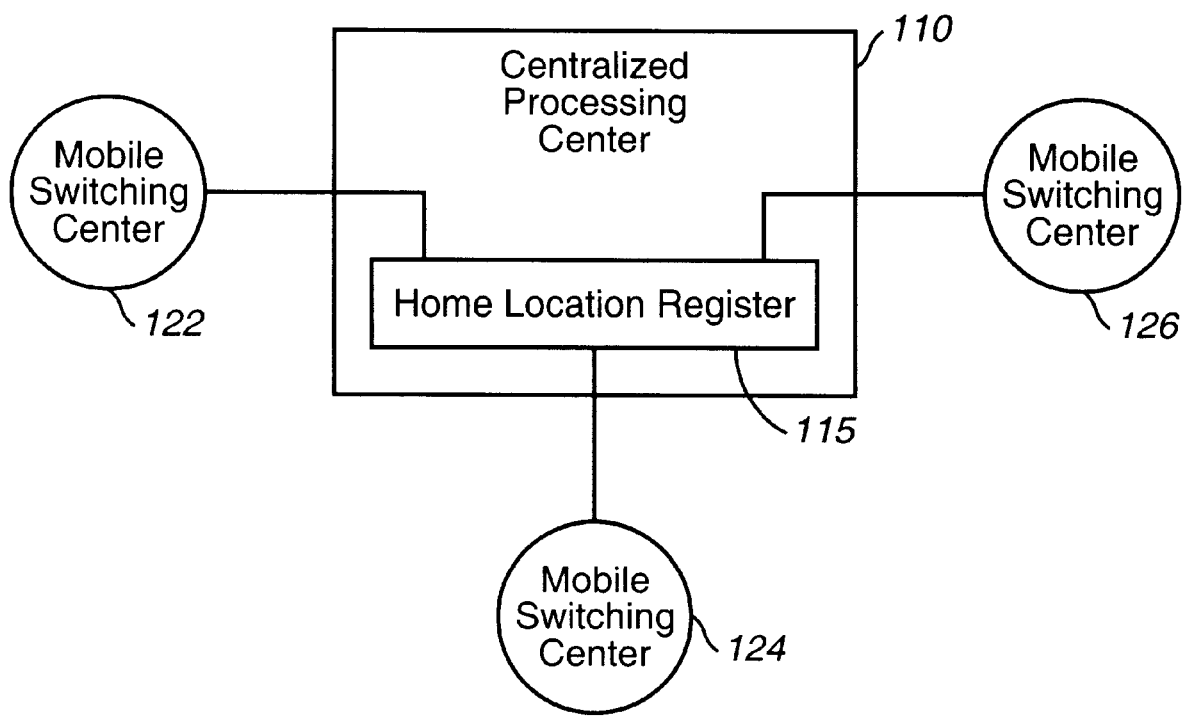
FIG. 1 is a block diagram of an exemplary telecommunications system.

FIG. 1 illustrates an exemplary telecommunications system embodying the present invention. Telecommunications system 100 includes a centralized processing center 110, a Home Location Register ("HLR") 115, and three mobile switching centers 122, 124, 126. Each mobile switching center 122, 124, 126 services a limited geographic area, providing wireless service to mobile subscribers within each respective geographic area. As shown in FIG. 1, a HLR 115 is shown at centralized processing center 110. As will be discussed in detail in the following, HLR 115 is a functional database with SDS and MFC lookup tables. HLR 115 comprises a logical HLR and a physical HLR. Although only one logical HLR exists, it is within the scope of the invention to have multiple redundant copies of the same SDS and MFS lookup tables stored in HLR 115 for performance and/or reliability reasons. For example, there may be two HLR sites that are redundant. Moreover, the SDS and MFC lookup tables may be partitioned. Furthermore, multiple HLRs may be used using industry techniques that coordinate and synchronize distributed databases as an alternative to centralized HLRs.

HLR 115 is a functional database entity in charge of subscriber profile and mobility management information for mobile subscribers. A more complete description of HLR functionality appears in *Cellular Radiotelecommunications Intersystem Operations: Functional Overview*, EIA/TIA/IS-41, February 1996, which is herein incorporated by reference in its entirety. For present purposes, it is only necessary to understand that HLR 115 contains, inter alia, two general types of mobile subscriber information: (1) subscription information; and (2) location information.

The subscription information contained within HLR 115 includes a list of basic and supplementary services for each mobile subscriber. This list includes parameters such as teleservices subscription information, service restrictions (e.g., roaming limitations), and supplementary service parameters. More complete information regarding these parameters appears in EIA/TIA/IS-41, described above. The location information contained within HLR 115 includes a visitor location register ("VLR") address and a mobile switching center ("MSC") address, which are keyed to the mobile subscriber's Mobile Identification Number ("MIN"). In addition, the VLR and MSC may be keyed to the mobile subscriber's International Mobile Station Identity Number ("IMSI").

This mobile subscriber information, together with information contained within an SDS Lookup Table, permits HLR 115 to translate received SDSs into numbers to be dialed, as explained below. Similarly, the mobile subscriber information permits HLR 115 to translate MFCs to cause a change in a mobile subscriber's profile. Each of these cases is explained in detail below.

An SDS/MFC may conveniently be thought of as a dialed string that is configured in any of the following ways: (1) three digits in length; (2) begins with a single star ("*"); (3) begins with a double star ("**"); (4) begins with a pound sign ("#"); or (5) begins with a double pound sign ("##"). One of ordinary skill in the art will recognize that the present invention is, however, not limited to only these exemplary SDS/MFC formats. For example, although a length of three digits is described, it is withing the scope of the invention to use any length, for example, a length of one to ten digits.

To access HLR 115 to perform a SDS and/or MFC translation, mobile switching centers address HLR 115 through the use of a trigger. The trigger is set in any of the subscriber profiles stored in HLR 115. The trigger is downloaded to the mobile switching center as a result of a registration request from the MSC to the HLR, for example, upon a request generated by the MSC as a result of subscriber powering on their phone. The trigger comprises an origination trigger parameter that is set to trigger whenever a pre-condition is satisfied. For example, the trigger may be set such that any time the mobile service subscriber dials, for example, a three digit string or a string that begins with a star (*), double star (**), a pound (#), or a double pound (##) the trigger is launched. As discussed above, the trigger is initially downloaded from HLR 115 to the mobile switching center. Thus, when dialed digits are received at the mobile switching center, if the dialed digits are of the type that activate the trigger, then the mobile switching center launches a query to HLR 115 for a translation of the dialed digits. In accordance with the invention, when a subscriber registered at HLR 115 enters a SDS or MFC, a translation request is sent to HLR 115 to determine appropriate translation of the dialed digits. In other cases, for instance if a regular seven digit number was entered, the digits would be processed at the mobile switching center without asking HLR 115 for translation, unless, of course, a trigger was set on the seven digit number.

Figure 2:
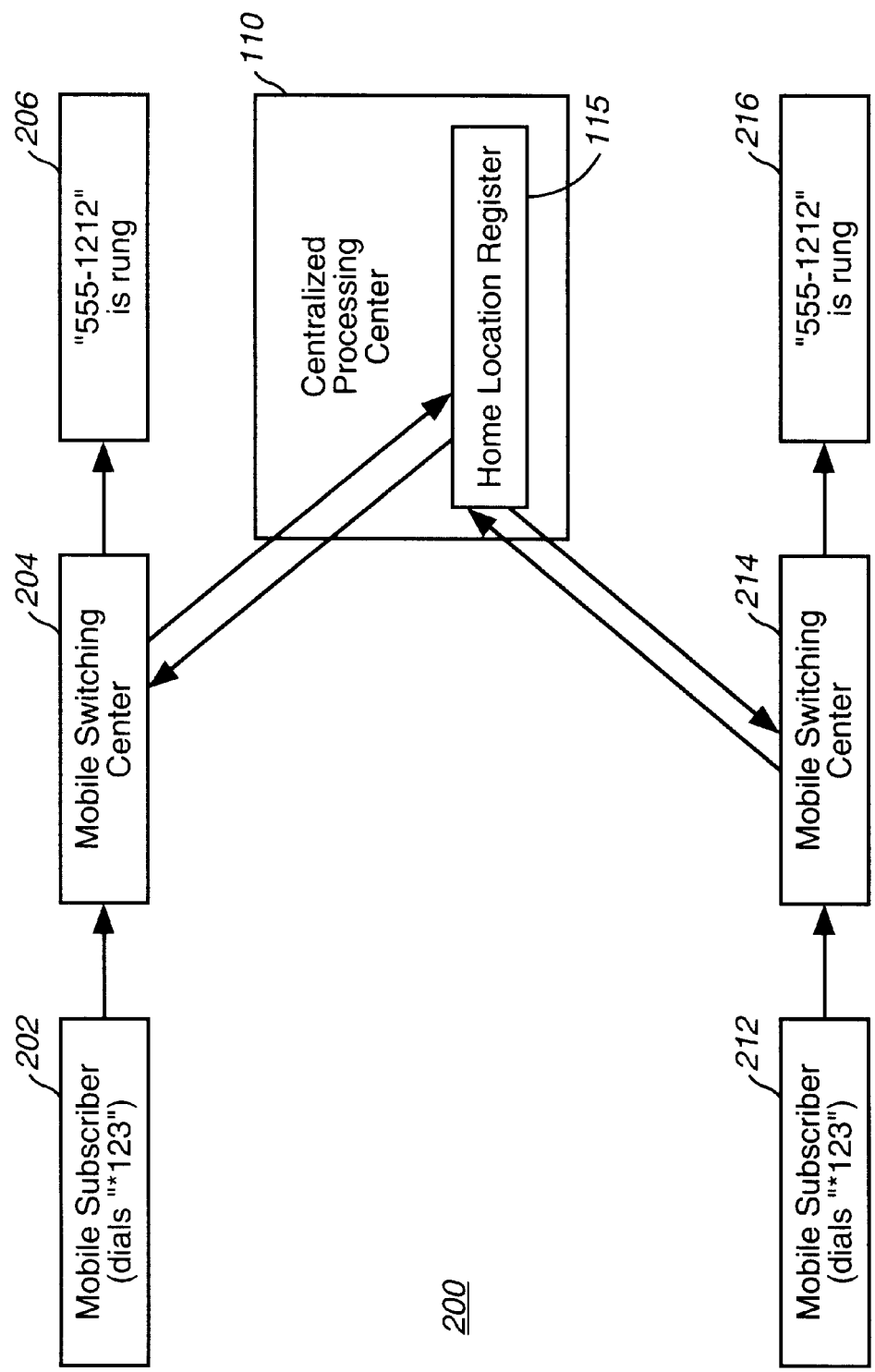
FIG. 2 is a block diagram generally illustrating operation of the invention.

Operation of the present invention can now be explained with reference to FIG. 2. FIG. 2 illustrates generally the operation of the present invention within an exemplary telecomnmunications system. Although FIG. 2 illustrates the operation of the present invention in a system including only two mobile switching centers 204, 214, the present invention is equally applicable to systems including any number of mobile switching centers.

Mobile subscriber 202 first dials an SDS/MFC (e.g., *123). A wireless signal containing the SDS/MFC is received by nearby mobile switching center 204 which becomes responsible for processing the mobile subscriber's call. Mobile switching center 204 then passes the received SDS/MFC (*123), together with other information, to centralized processing center 110. Translation of the received SDS/MFC into a number to be dialed (or feature control) is performed by the Home Location Register 115 within centralized processing center 110.

After translation of an SDS, the number to be dialed is returned to mobile switching center 204. This permits mobile switching center 204 to dial the translated number (e.g., 555-1212). Alternatively, after translation of an MFC, the mobile subscriber's profile is changed. This causes a change in the mobile subscriber's service features. A similar sequence occurs when mobile subscriber 212 dials an SDS/MFC (e.g. *123), however with mobile switching center 214 passing the received SDS (or MFC) to centralized processing center 110.

Importantly, mobile subscriber 212 may be the same as, or different from, mobile subscriber 202. The first case (where mobile subscriber 202 is the same as mobile subscriber 212) would occur when the same mobile subscriber dials the same SDS/MFC from two different locations. This could occur if the mobile subscriber has changed locations between placing the calls. In this case, a different mobile switching center 204, 214 would be responsible for processing each of the calls.

The second case (where mobile subscriber 202 is different from mobile subscriber 212) would occur if two different mobile subscribers in two different geographic areas dial the same SDS/MFC. In either of these cases, centralized processing center 110 performs translation of the SDS/MFC. Therefore, consistent translation of the SDS/MFC is ensured.

Figure 3:
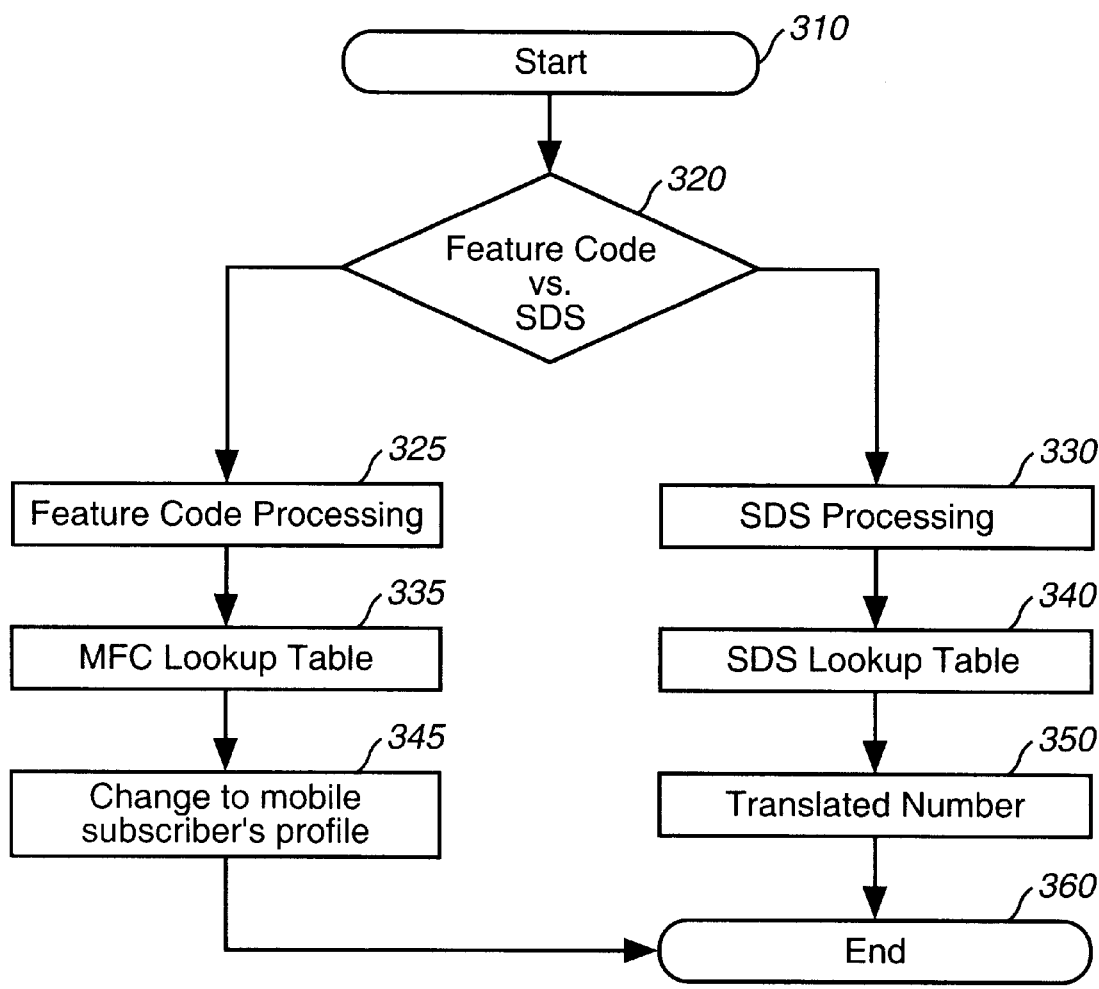
FIG. 3 is a control flow diagram generally illustrating the processing of a Special Dialing String and a Mobile Feature Code.

FIG. 3 generally illustrates the processing of a received wireless string (e.g., an SDS or MFC) by the present invention. Processing of the received string by HLR 115 within centralized processing center 110 begins at step 310, where the received string is immediately processed according to step 320.

In step 320, HLR 115 first checks the received string to determine whether it is indeed an actual SDS, or whether it is a valid MFC. In a preferred embodiment, if the received string begins with either a single star ("*") or a double star ("**"), the string may represent an MFC control request, and not an actual SDS. A complete description of Mobile Feature Codes and mobile feature code processing is provided in *Cellular Features Description*, EIA/TIA/IS-53, May 1995, which is incorporated herein by reference in its entirety.

If the received string is in fact a valid MFC, HLR 115 processes the received string as a feature code as shown generally by step 325, where processing continues immediately according to step 335. As shown in steps 335 and 345, HLR 115 uses an MFC lookup table to convert the MFC into a change in the mobile subscriber's profile. Specific details regarding this conversion/translation appear below. Following translation of the received MFC, processing within HLR 115 is complete, as shown by step 360.

If the received string is not an MFC, but rather an actual SDS, HLR processing continues according to step 330, where processing continues immediately according to step 340. As shown in steps 340 and 350, HLR 115 uses an SDS lookup table to convert the actual SDS into a number to be dialed. Specific details regarding this conversion/translation appear below. Following translation of the received SDS, processing within HLR 115 is complete, as shown by step 360. The number to be dialed is then preferably returned to the mobile switching center for actual dialing.

FIG. 4 illustrates the SDS lookup table 410 record format, as used by HLR 115 to translate received SDSs. SDS Lookup Table 410 records include the dialed string number 420 ("DS"), a subscriber group number 430 ("SGN"), an SDS mobile switching center group number 440 ("MGN"), and the number to be dialed 450 (translated number). Using the information in SDS lookup table 410, HLR 115 can translate a received SDS into a number to be dialed.

Translation of received SDSs is preferably implemented using a table driven method. To accomplish this, the MSC responsible for processing the mobile subscriber's call sends the SDS, the mobile subscriber's mobile identification number ("MIN"), and the SDS MSC Identification number to HLR 115 in the centralized processing center. HLR 115 then uses this information to determine which SGN the mobile subscriber is assigned to, and which MGN the MSC is assigned to. Therefore, the table utilized can associate SDSs with particular subscribers, particular geographies, or a combination of both.

MFC processing is very similar, however with an important distinction. FIG. 5 illustrates the MFC lookup table 510 record format, as used by HLR 115 to translate received MFCs. MFC Lookup Table 510 records include the dialed string number 520 ("DS"), a subscriber group number 530 ("SGN") and an action 540 to invoke a feature and change the subscriber's profile. Action 540 invokes a feature, for example, to change to call forwarding or to disable call waiting. Using the information in MFC lookup table 510, HLR 115 can translate a received MFC into a change to the mobile subscriber's profile. Because it is desirable to have MFC control remain consistent regardless of a mobile subscriber's geographic location, the MFC lookup table does not require MGN entries.

Similar to SDS translation, MFC translation/control is also preferably implemented using a table driven method. To accomplish this, the MSC responsible for processing the mobile subscriber's call sends the MIN and the MFC to HLR 115 in the centralized processing center. HLR 115 then uses this information to determine which SGN the mobile subscriber is assigned to. The user's profile can then be changed according to the MFC which was dialed.

In one embodiment of the present invention, SDSs are translated according to the following priority order: (1) An SDS having significance for a particular subscriber and a particular geography has the highest priority; (2) An SDS having significance for any subscriber in a particular geography has the second highest priority; (3) An SDS having significance for a particular subscriber in any geography has the third highest priority; and (4) An SDS having non-subscriber specific and non-geographic specific significance has the lowest priority.

By using the aforementioned priority scheme, the present invention ensures consistent translation of SDSs, while at the same time permits customized/flexible translation where desired. For example, any specific SDS can be provisioned to translate to the same dialed string for all subscribers (e.g., *123 translates to 555-1212). However, for a specific subscriber (or group of subscribers), a different translation could be designated for the same SDS. Because subscriber specific strings have higher priority than non-subscriber specific strings, the desired translation would therefore be ensured.

Figure 6:
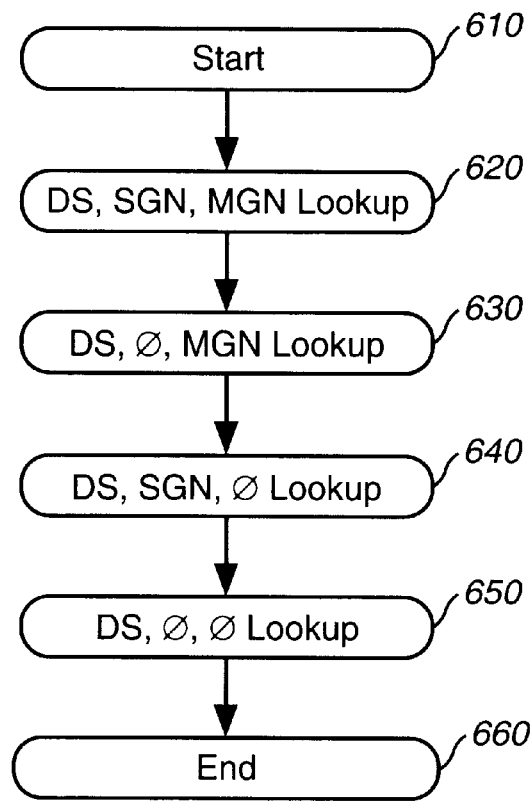
FIG. 6 is a control flow diagram illustrating priority processing of a Special Dialing String within the SDS lookup table in the Home Location Register.

By way of example, the preferred translation priority of SDSs can be further explained with reference to FIG. 6. FIG. 6 is a control flow diagram illustrating the translation of an SDS by HLR 115 according to the priority order described above. HLR 115 uses a table driven method to determine the proper translation for an SDS. As explained in detail below, the method takes into account: (1) the SDS; (2) the SDS subscriber group number ("SGN"); and (3) the SDS mobile switching center group number ("MGN") for the mobile switching center serving the mobile subscriber.

Processing begins at step 610, where HLR 115 immediately processes the SDS according to steps 620–650. Steps 620–650 implement the preferred priority order described above. Processing continues in the order shown until a match is found, or until all four searches have been performed. Thus, processing comprises performing four lookups to the same table, SDS lookup table 400. Each of these steps is explained below.

First, as shown in step 620, HLR 115 searches SDS lookup table 400 for a subscriber group specific dialing string that is also specific to a geographical area group (DS, SGN, MGN). Next, as shown in step 630, HLR 115 searches SDS lookup table 400 for a dialed string that is specific to a geographic area group (DS, 0, MGN). The "0" indicates that all groups are considered. Next, as shown in step 640, HLR 115 searches SDS lookup table 400 for a subscriber specific dialing string that is not specific to a geographic area group (DS, SGN, 0). Finally, as shown in step 650, HLR 115 searches SDS lookup table 400 for a global dialed string that is not dependent on the subscriber group or the geographic area group (DS, 0, 0).

To facilitate meaningful translation, the records contained in SDS lookup table 410 are provisioned by an administration system. In one embodiment, mobile subscribers are assigned to subscriber group numbers ("SGNs"), and mobile switching centers are assigned to MSC group numbers ("MGNs"). In these assignments, a zero ("0") cannot be used. A zero ("0") can, however, be used in the translation table to mean "all" elements (e.g., a "don't care"). Therefore, an SDS can apply to a specific subscriber by placing only that subscriber in any particular subscriber group number. Similarly, a single mobile switching center can be assigned to an MGN, permitting geographic control of SDS translation. MFC lookup records are similarly maintained. Although MFC lookup tables do no include MGNs because it is assumed that a user would want to use the same codes to control features in their profile regardless of their geographic location, it is within the scope of the invention to include MGNs in the MFC lookup table if desirable.

Figure 7:
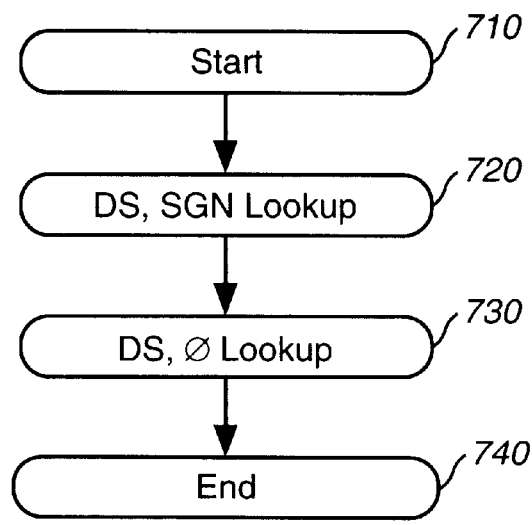
FIG. 7 is a control flow diagram illustrating priority processing of a Mobile Feature Code within the MFC lookup table in the Home Location Register.

FIG. 7 is a control flow diagram illustrating the translation of a MFC by HLR 115. HLR 115 uses a table driven method to determine the proper translation for a MFC. Processing begins at step 710, where HLR 115 processes the MFC according to steps 720 and 730. Processing comprises performing two lookups to the same table, MFC lookup table 500. First, as shown in step 720, HLR 115 searches MFC lookup table 500 for a subscriber group specific dialing string (DS, SGN). Next, as shown in step 730, HLR 115 searches MFC lookup table 500 for a global dialed string that is not dependent on the subscriber group (DS, 0). The process ends at step 740.

Owing to the flexibility of this implementation, SDS/MFC translation can be standardized across all subscribers and/or geographies. SDS translation can also be customized for specific mobile subscribers (or groups of subscribers) and/or particular geographies. The same SDSs/MFCs can therefore be re-used for different purposes. As will be recognized by one of ordinary skill in the art, the disclosed translation method can also be applied to any telecommunications system using dialing strings.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for handling special dialing strings in a wireless telecommunications system, comprising the steps of:
   (a) receiving a special dialed string in a mobile switching center;
   (b) passing said special dialed string from said mobile switching center to a home location register including a special dialing string lookup translation table; and
   (c) translating said special dialed string to a number to be dialed using said translation table at said home location register, including the steps of:
      (1) performing a dialed string lookup on said dialed string;
      (2) performing a subscriber group number lookup on said dialed string; and
      (3) performing a mobile switching group number lookup on said special dialed string, wherein said number to be dialed is derived from said dialed string lookup, said subscriber group number lookup and said mobile switching group number lookup.

2. The method of claim 1, further comprising the step of:
   (d) returning said number to be dialed to said mobile switching center.

3. A wireless telecommunications system including at least one mobile switching center for handling subscriber calls and a centralized processing center for translating a special dialing string received by said mobile switching center from a mobile subscriber, wherein said centralized processing center comprises:
   a home location register containing:
      subscriber profile information,
      mobility management information for the mobile subscriber, and
      a special dialing string lookup table containing a dialed string, a subscriber group number and a mobile switching center group number,
   whereby said special dialing string is translated iteratively within said home location resister using said subscriber profile information, said mobility management information, and said information stored in said lookup table.

4. The system of claim 3, wherein said special dialing string lookup table further includes a translated number.

5. A wireless telecommunications system including at least one mobile switching center for handling subscriber calls and a centralized processing center for translating a special dialing string (SDS) received by said mobile switching center, wherein said centralized processing center comprises:
   means for receiving an SDS from a mobile switching center;
   means for translating said received SDS into a number to be dialed; and
   means for returning said number to be dialed to said mobile switching center,
   wherein said means for translating includes:
      means for performing a dialed string lookup on said SDS; and
      means for performing a subscriber group lookup on said SDS; and
      means for performing a mobile switching group number lookup on said SDS, wherein said number to be dialed is derived from said dialed string lookup, said subscriber group number lookup, and said mobile switching group number lookup.

6. The system of claim 5, wherein said translating means includes a home location register.

7. The system of claim 5, wherein said home location register includes an SDS lookup table.

8. The system of claim 6, wherein said SDS lookup table includes subscriber group number information and mobile switching center group number information.

9. A method for handling dialing strings in a wireless telecommunications system, comprising the steps of:

(a) receiving a dialed string in a mobile switching center;

(b) passing said dialed string from said mobile switching center to a home location register having a dialing string lookup translation table including dialed strings, subscriber group numbers, and mobile switching group numbers; and (c) translating said dialed string, at said home location register, using said translation table, wherein said translating step includes:

(1) performing a dialed string lookup, a subscriber group number lookup, and a mobile switching group number lookup on said dialed string;

(2) performing a dialed string lookup and a mobile switching group number lookup on said dialed string;

(3) performing a dialed string lookup and a subscriber group number lookup on said dialed string; and (4) performing a dialed string lookup on said dialed string, wherein steps (c)(1)–(c)(4) occur in a predefined priority order, and wherein when a first match for said dialed string is found in said translation table then said dialed string is translated based on said first match.

10. The method of claim 9, further comprising the step of:

(d) returning a number to be dialed to said mobile switching center if said dialed string is a special dialing string, wherein said number to be dialed is derived from a result of said translating step.

11. The method of claim 9, further comprising the step of:

(d) changing a mobile subscriber profile if said dialed string is a mobile feature code, wherein said change in said mobile subscriber profile is derived from a result of said translating step.

* * * * *